April 16, 1929.  U. CAUCHY  1,709,060
MUD GUARD FOR VEHICLES
Filed March 6, 1926  2 Sheets-Sheet 1
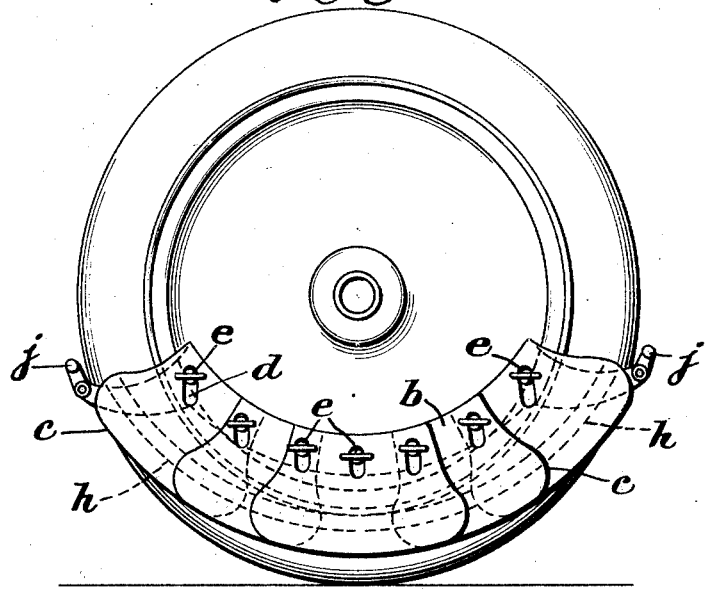
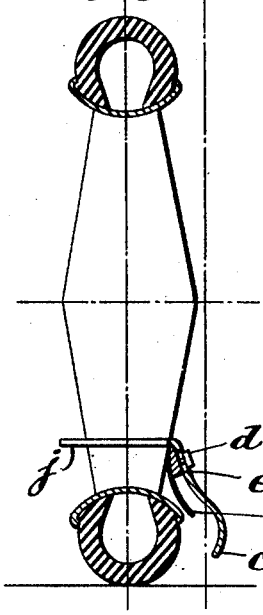
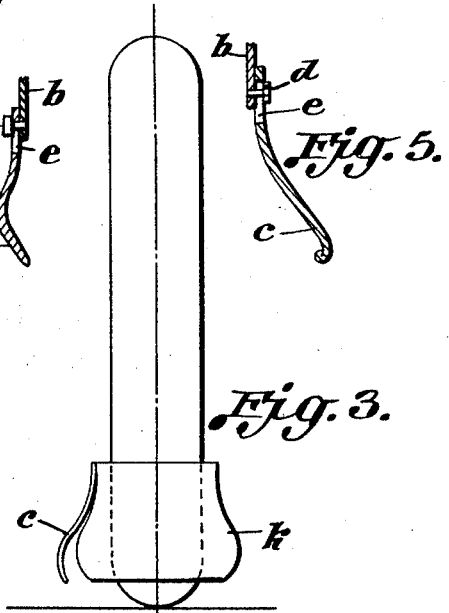
Inventor:
URBAIN CAUCHY
by Richards & Geier
Attorneys

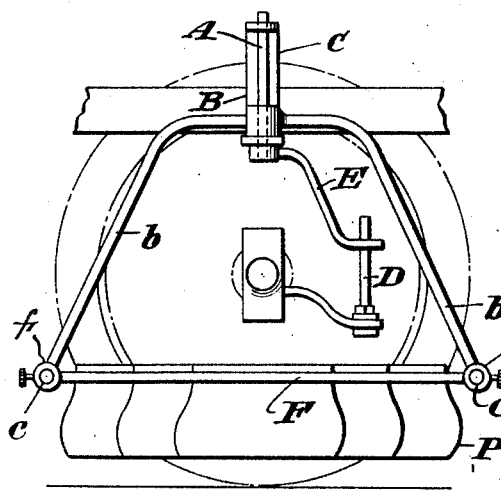
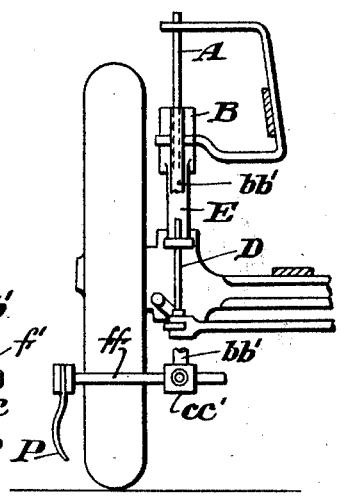
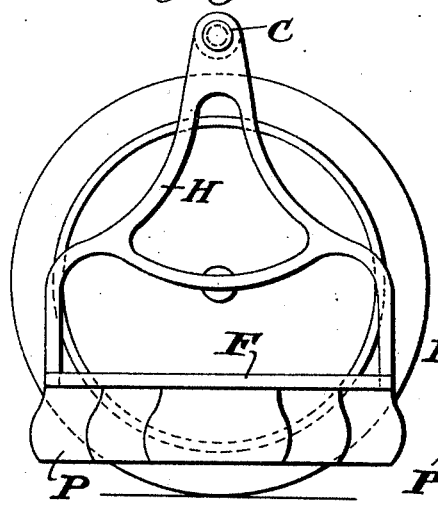
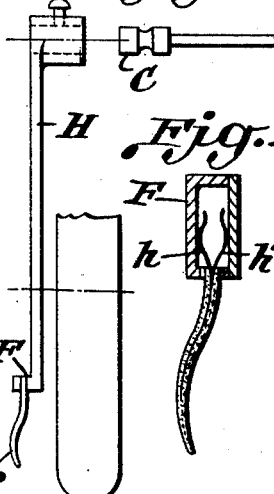
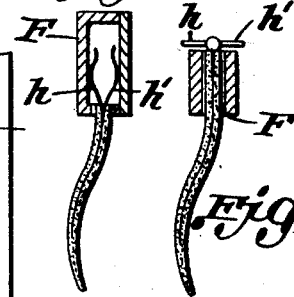

Patented Apr. 16, 1929.

1,709,060

UNITED STATES PATENT OFFICE.

URBAIN CAUCHY, OF TOURCOING, FRANCE.

MUD GUARD FOR VEHICLES.

Application filed March 6, 1926, Serial No. 92,914, and in France March 7, 1925.

The whole problem presented by the mudguard is that of keeping constantly and in the most regular manner possible the useful or working end of any projecting member whatever at a predetermined point, in such a way that a sure and completely effective protection is obtained against the projection of water and mud upon both pedestrians and houses.

From an examination of the great number of more or less ingenious devices which have been evolved it seems that it has been thought that the best solution of this problem would be to stop the mud thrown out at the point of formation of the splash. In fact the end of the protecting member has nearly always been made to come as near as possible to the ground, giving rise to fitting difficulties of all kinds, for instance those resulting from the constant shocks and crushing to which the protecting member is subjected through coming into contact with projections upon the road, which greatly fatigues the said protecting member producing its rapid wear and causing it to lose thus its efficiency.

It has therefore been questioned if the truly practical solution of the problem presented by the mud-guard does not rather exist in the application of a different principle which would consist in keeping the useful end of the protecting member as high as possible above the ground.

In fact, as the result of a series of experimental observations the following principle has been evolved, that: "The useful end of a mud-guard may be kept at a distance from the ground which is as much greater in proportion as the distance between this end and the point of contact of the wheel with the ground is increased"; assuming that it is possible without inconvenience to neglect the small mud splashes the length of projection of which is less than fifty centimetres.

The great advantage is immediately seen of the application of this principle which will enable, in as far as is deemed advisable, contact of the mud-guard with the ground to be avoided.

One difficulty however existed, arising from the fact that it was impossible to place an apparatus too far from the wheel without affecting the safety of the traffic circulation. For this reason attempts have been made to find special devices which will be described hereinafter and which enable this safety to be obtained completely.

The apparatus hereinafter described is characterized by:

1. A first member forming the mud-guard proper which may be made of any rigid or flexible material, but preferably of rubber or of leather, or any other material which may be suitable in order to preserve rigidly the geometrical forms, combined in straight, convex, concave or oblique parts, it is desired to give them.

This change in form which separates its lower end is the characteristic feature of this first member which may be made in a single piece of sufficiently large dimensions or which may be formed of a number of parts or shells arranged in such a way as to overlap each other and be partially superposed.

2. A frame specially constructed to carry the mud-guard, whether it is made in a single piece or formed of several parts, comprising a certain number of fixed pivots terminating in automatic attachment means, or movable heads of any kind, which pivots enter into eyes or slideways formed in the upper end of the mud-guard or of each of its parts.

3. A member called the "breaker" because its function is to break the richochets of the splashes which, without it, would be thrown back upon the road by the mud-guard and projected afresh. This "breaker" of suitable form, is formed by a band of rubber or other material attached by any suitable means to the inner face of the frame.

Figures 1 to 11 in the accompanying drawing illustrate by way of example one form of the mud-guard arrangement which is adapted to fulfill entirely the requirements stated.

Figure 1 is an elevation of the wheel provided with the mud-guard arrangement.

Figure 2 is a vertical section through the wheel showing the special arrangement of the mud-guard with its frame placed as near as possible to the wheel.

Figure 3 is an end view of the wheel showing the additional member provided for the protection of the wheel itself.

Figures 4 and 5 are drawings to a larger scale of a part of a convex or concave shell or plate provided with slideways and automatic means of attachment.

Figures 6 to 11 relate to the automatic suspension.

In the form of construction shown in these drawings it is seen that the mud-guard device comprises a certain number of parts made of suitable material in the form of plates $c$ the concave side of which faces the pneumatic tyre. These parts are arranged upon a metal frame $b$ suitably constructed and comprising a certain number of fixed pivots $d$ terminating in automatic or other attachments. These members serve as points of attachment and enter into slideways $e$ with which the parts are provided and on account of which the said members have a certain amount of freedom of movement upon the fixed pivots $d$. The parts $c$ constructed in the form of plates overlap each other and their lower ends are kept at a certain distance from the ground proportional to the distance from the wheel to which they may be fitted.

The inner part of the frame $b$ is provided with the "breaker" $h$ formed of a special band of rubber or any other material the lower end of which is slightly incurved and which is shorter than the part $c$. This "breaker" comes as near as possible to the tyre.

The apparatus thus arranged is placed as shown in the drawing and adjusted in such a way that the working or useful end of the mud-guard proper $c$ is at a distance from the ground proportional to its distance from the wheel. The frame $b$ terminates in hooks $j$ which are mounted upon supports provided upon the chassis, on either side of the wheel, or are suspended from the body work or by any other means. This frame may also be arranged to be mounted upon the steering swivel if it is preferred.

The member $k$ shown in figure 3 is placed in front of and behind each wheel. It is composed of one or more parts which fit upon an extended portion of the frame in order to envelop the wheel as closely as possible. The same means of attachment may be employed. This addition of members $k$ will thus form an efficient protection for the vehicle.

*Automatic suspension of the mud-guard.*

Figures 6 to 11 illustrate by way of example devices provided for the automatic suspension of the mud-guard.

Figure 6 is a view of a suspension placed behind a front wheel, the frame of the mud-guard being secured automatically to the right and to the left of the wheel.

Figure 7 is a side view showing the way in which the suspension works.

Figure 8 is an elevation of a modification of the suspension placed in front of the wheel.

Figure 9 is a side view of the automatic suspension device rendering the whole of the mud-guard movable or adapted to be oscillated.

Figures 10 and 11 are sectional views of the rods forming the frame of the mud-guard showing modified forms of the movable nature of the points of attachment of the protecting members.

Referring to these drawings, it is seen in Figures 6 and 7, that a pivot $A$ is provided which is adapted to fit into a socket or sleeve $B$ secured to arms $b$ and $b'$ terminating in sockets $c$ and $c'$. This arrangement is adjustable in height and suitably mounted upon $A$. As regards $A$, this pivot turns upon a fitting $C$ securely mounted either upon the body work or upon the chassis of the vehicle.

In order that the socket $B$ and the branches $b$ and $b'$ will be able to follow the direction of the wheels, the pivot $D$ of the steering rod is extended and enters a sufficient distance into a slideway or fork depending from an arm $E$ secured to $A$.

If the wheel is provided with a front plate the casing of the brake may be employed for holding a special pivot which will directly actuate the pivot by any suitable means. The whole of this apparatus being placed behind the wheel, the mud-guard proper mounted upon the rods $F$ carrying the rods $f$ and $f'$ one of which may be movable, is easily placed in position by inserting the rods $f$ and $f'$ into the sockets $c$ and $c'$ in which they are automatically secured by a spring locking device or any other automatic means desired which will ensure that the mud-guard is carried in a proper manner.

By way of modification, Figure 8 shows a suspension placed in front of the wheel; the pivot $A$ is similar in construction to the one shown in Figure 6. However, a short branch terminating in a head $G$ provided with a groove is adapted to receive the frame $H$ carrying the rods $F$ which support the members of the mud-guard proper $P$.

An automatic locking device $I$, by means of a spring, safety catch or the like, enables the apparatus to be mounted in position or removed at once.

As shown in Figures 10 and 11 the rods $F$ form the frame of the mud-guard proper $P$. They are arranged so as to hold the members of the mud-guard in such a way that the latter can move freely, and may be detached easily and automatically in the event of suspension or for any other reason. For this purpose blades or plates forming a spring or movable branches $h$ and $h'$ are rendered integral with the material forming the said members. The "breaker" is placed as hereinbefore described.

As will be understood, the apparatus thus formed in order to be mounted or arranged as convenient in order to turn with the wheel, is simple and may be easily mounted upon all vehicles. It is sufficient to adjust it a first time in order to be able to place it in position or remove it at once. It is effective in a sure and complete manner; it consequently combines all the desirable safe-guards.

I claim as my invention:

1. A mud-guard for vehicle wheels, including an arcuate frame adapted for suspension alongside of a wheel and having a plurality of fixed pivots forming attaching means, and a plurality of curved plates supported on said frame in overlapping relation to each other and all having vertically disposed slots therein to receive said pivots, whereby said plates may be adjusted relative to said frame, and whereby the distance of the plates above the ground and the extent of their overlapping relation may be regulated.

2. A mud-guard for vehicle wheels, including a frame adapted for suspension alongside of a wheel and having a plurality of fixed pivots forming attaching means, a plurality of curved plates supported on said frame in overlapping relation to each other and having slots therein to receive said pivots whereby said plates may be adjusted relative to said frame, and a breaker device supported by said frame and disposed between said plates and the wheel in close proximity to the latter.

3. A mud-guard for vehicle wheels, including an arcuate frame adapted for suspension alongside of a wheel and having a plurality of fixed pivots forming attaching means, a plurality of curved plates supported on said frame in overlapping relation to each other and all having vertically disposed slots therein to receive said pivots, whereby said plates may be adjusted relative to said frame, and whereby the distance of the plates above the ground and the extent of their overlapping relation may be regulated, and a breaker device supported by said frame and disposed between said plates and the wheel in close proximity to the latter.

In testimony whereof I have affixed my signature.

URBAIN CAUCHY.